Oct. 26, 1965  N. R. HAMM  3,214,192
TRACTOR PUSHER SHOCK CUSHIONING ATTACHMENTS
Original Filed May 12, 1958  3 Sheets-Sheet 1
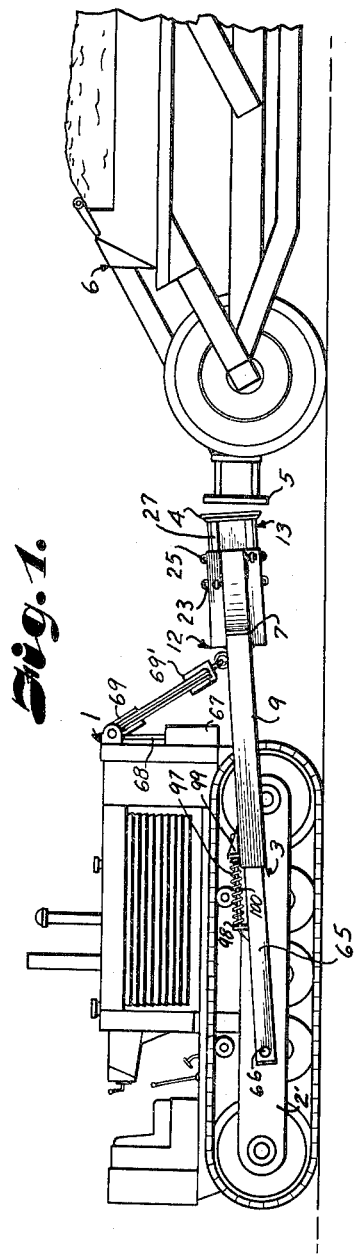
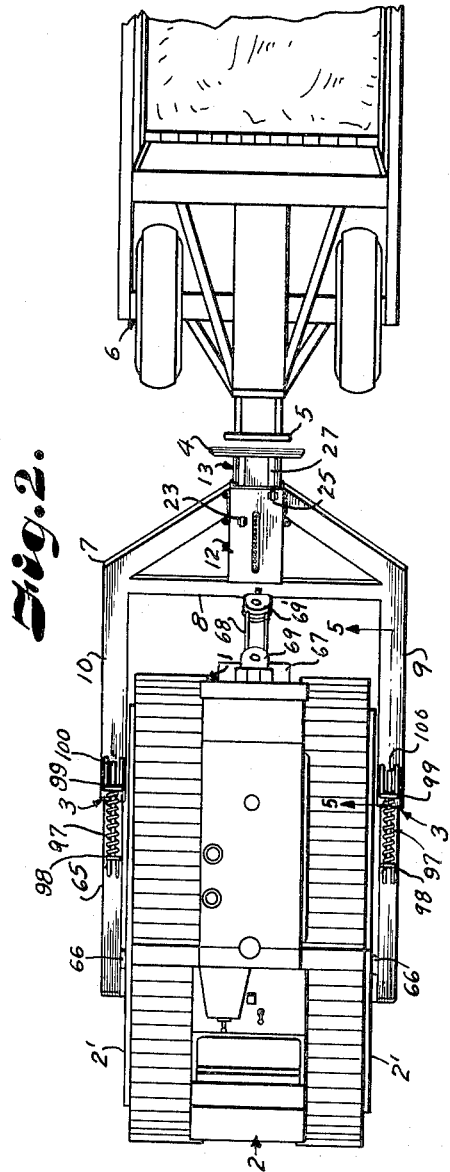
INVENTOR.
Norman R. Hamm.
BY
Strauch, Nolan & Neale
ATTORNEYS.

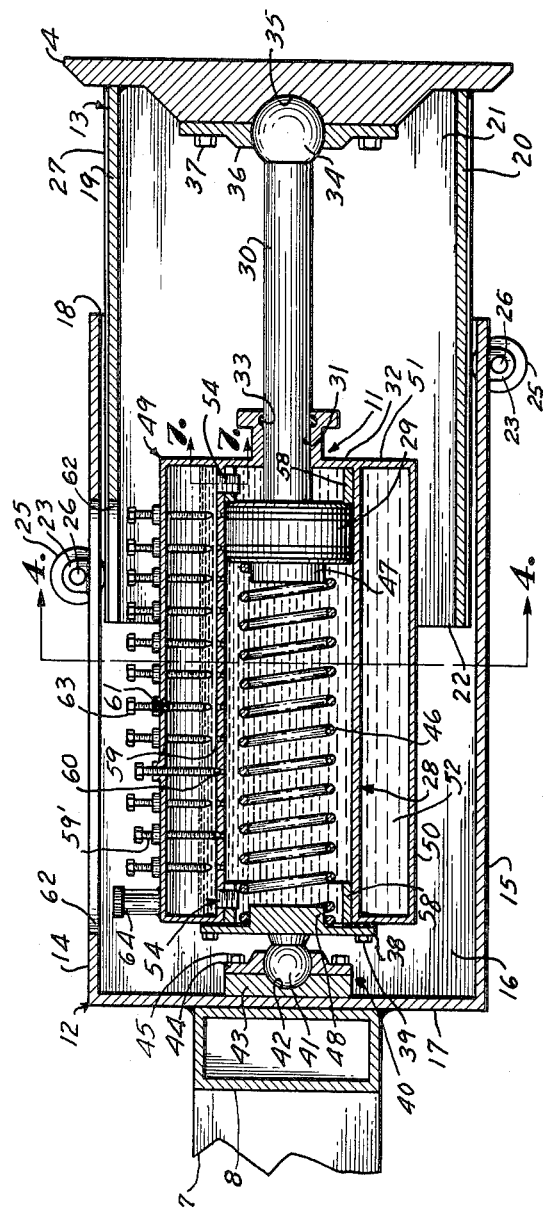

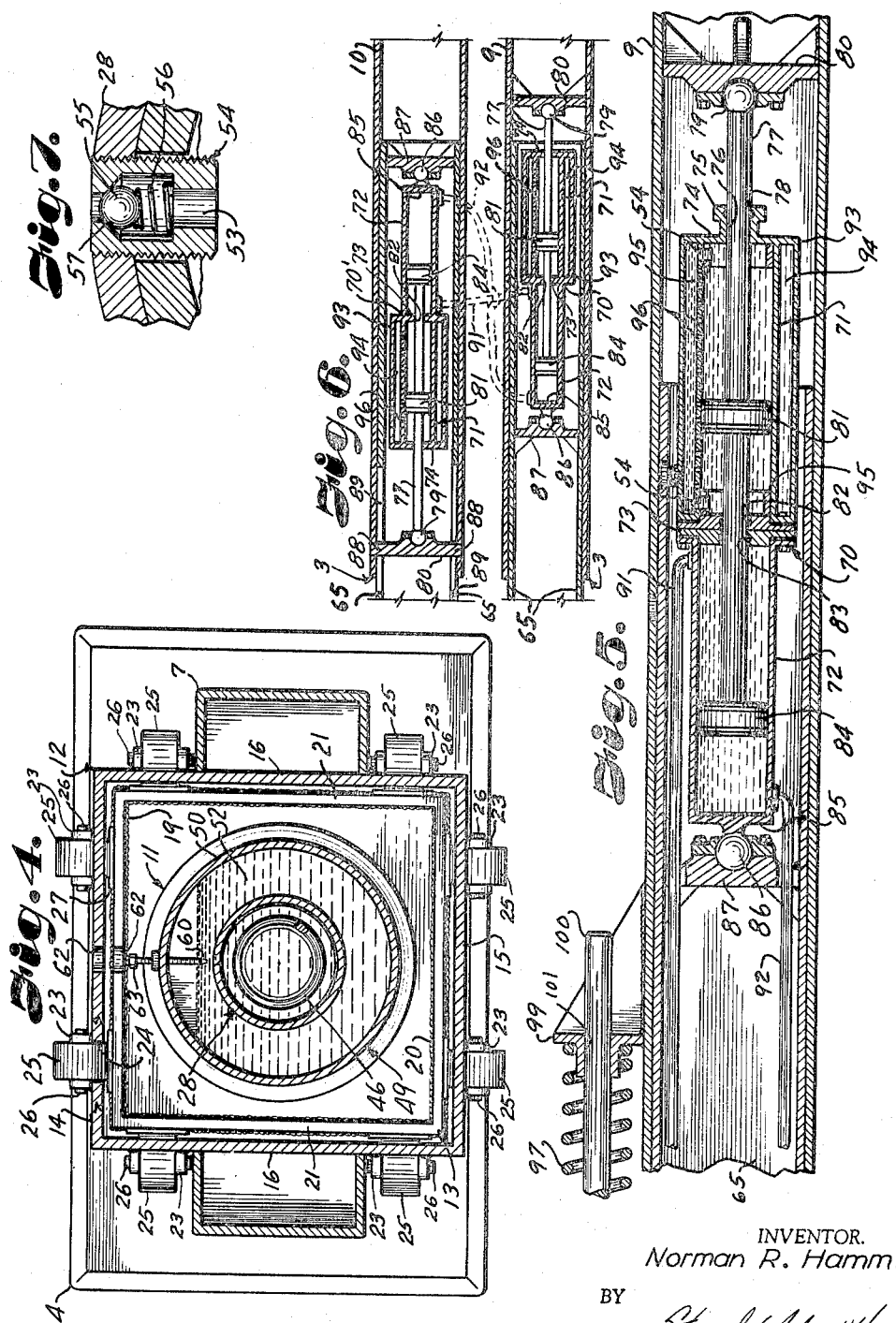

United States Patent Office 3,214,192
Patented Oct. 26, 1965

3,214,192
TRACTOR PUSHER SHOCK CUSHIONING
ATTACHMENTS
Norman R. Hamm, Perry, Kans., assignor to Rockwell Manufacturing Company, Pittsburgh, Pa., a corporation of Pennsylvania
Continuation of application Ser. No. 734,704, May 12, 1958. This application Oct. 16, 1961, Ser. No. 145,319
9 Claims. (Cl. 280—481)

This is a continuation of application Serial No. 734,704 filed May 12, 1958, now abandoned.

This invention relates to load pushing structures, and more particularly to such structures that are subjected to shock in the engagement thereof with a load member in response to relative movement of one toward the other.

When a vehicle or other moving structure is moved against a substantially stationary load member or the like, substantial shock loads are imposed on the contacting elements. For example, in grading and earth moving, self-propelled or tractor drawn scrapers are used to load and transport the earth. However, such equipment is not usually designed to be self-loading, and in making an excavation or cut the scraper usually proceeds as far as possible under the tractive effort supplied by its draft tractor or prime mover, and then receives assistance from push tractors to add the tractive effort hereof to move the scraper during excavating or loading. In such srapers, it is common practice to provide a pusher block at the rear end for engagement by a push plate or push member supported by heavy frame-work in the front of the push tractor. Usually, the scraper is substantially stalled before the pusher tractor moves up and engages the pusher block to add the tractive effort thereof to the propelling force of the scraper. When the pusher plate on the push tractor is engaged with the pusher block on the scraper, it results in initial shock loads of considerable magnitude being imposed on the pusher elements and scraper and tractor. The magnitude of the initial shock is such that the operator of the push tractor is usually fearful of the terrific impact of metal against metal and the resulting damages to the equipment caused by the impact, and therefore, an operator usually carefully maneuvers the push tractor and slows the approach thereof to the scraper to minimize the shock. This results in loss of time in making the contact and loss of productive work from both the scraper and the push tractor.

The principal objects of the present invention are to provide a shock cushioning pusher structure that substantially eliminates the above-mentioned disadvantages of present equipment; to provide a pusher attachment for tractors or other moving members which cushions and absorbs the shock resulting from engagement thereof with a load member; to provide a shock cushioning pusher structure including an hydraulic cylinder and piston with a plurality of flow passages or orifices communicating with the cylinder along the length thereof whereby movement of the piston in the cylinder reduces the number of flow passages through which the fluid may be discharged and thereby increases the flow resistance and the force required for further movement of the piston in the cylinder; to provide such a structure wherein the hydraulic fluid is forced through orifices from between the piston and one end of the cylinder and allowed to flow into the other end of the cylinder in response to movement of the piston toward said one end of the cylinder; to provide such a structure with a fluid reservoir communicating with the cylinder through the flow passages for maintaining a supply of fluid to fill the cylinder at all times; to provide such a structure with resilient means connected to the pushing structure to return the cylinder and piston to the initial position when the load is removed; to provide spaced shock cushioning pusher cylinders and pistons with each unit associated with communicating movement equalizing cylinder and piston units; to provide such a structure on a push frame mounted on and extending longitudinally of a vehicle together with a push plate extending transversely in front of the vehicle whereby limited movement rearwardly of the vehicle will be equal on both sides thereof; and to provide shock cushioning pusher structures and mountings therefor including hydraulic members which absorb the shock while retarding relative movement of the pusher and pushed members and yet provides substantial positive or solid pushing engagement between the mountings and push block to relieve pressure from the cylinders during actual pushing operations.

Other objects and advantages of this invention will become apparent from the following description taken in connection with the accompanying drawings wherein are set forth by way of illustration and example certain embodiments of this invention.

Referring more in detail to the drawings:

FIGURE 1 is a side elevation of the pusher attachment on a tractor about to be engaged with a scraper;

FIGURE 2 is a plan view of the pusher attachment and tractor and scraper illustrated in FIGURE 1;

FIGURE 3 is a longitudinal sectional view through the forward portion of the pusher frame and pusher plate with a shock cushion therebetween;

FIGURE 4 is a transverse sectional view through the pusher attachment and shock cushion on the line 4—4, FIGURE 3;

FIGURE 5 is a longitudinal sectional view through the side legs of the pusher frame and pusher cushion therein on the line 5—5, FIGURE 2;

FIGURE 6 is a diagrammatic horizontal sectional view through the shock cushions in the pusher frame legs; and, FIGURE 7 is an enlarged detail sectional view through the check valves in the shock cushion structures.

The invention is shown as embodied in a pusher attachment mounted on a tractor 1 which may be of conventional design and is shown in the drawings as a track laying type tractor. It is, of course, to be understood that the pusher attachments embodying the invention may be applied to other types of tractors, vehicles or moving members. In the illustrated structure, the tractor has a main frame 2 including side frame members 2' to which a push frame 3 is connected. The push frame extends forwardly longitudinally of the tractor and has a push plate 4 at the forward end thereof adapted to engage a push block 5 on a scraper 6 or other load member to be pushed. The push frame 3 includes a U-shaped member 7 having a bar portion 8 at the forward portion thereof, said bar portion having its ends connected to parallel legs 9 and 10 which extend rearwardly therefrom. The push plate 4 is preferably movably mounted relative to the push frame 3 or tractor 1 with a shock cushioning structure 11 interposed therebetween.

Cooperating guide members 12 and 13 are preferably supported on the frame member 7 and plate 4 respectively to guide the movement of the plate 4 forwardly and rearwardly relative to said frame substantially longitudinally relative to the tractor. In the illustrated structure, the guide members 12 and 13 are elongate tubular telescoped members slidably mounted one within the other for relative longitudinal movement. The tubular members are preferably rectangular in cross section, with the tubular member 12 having a top wall 14, bottom wall 15 and side walls 16, with the rear end closed by a wall 17 suitably secured as by welding to the transverse frame member 8, the forward end of said guide member 12 being open as at 18. The tubular member 13 has a top wall 19, bottom wall 20 and side walls 21, with the forward ends of said walls suitably secured as by welding to the push plate 4, the rear end of the tubular member 13 being open as at 22. The tubular member 13 is of such size that the walls thereof extend into the open end of the tubular member 12 with the side, top and bottom walls slidably engaging corresponding walls of the tubular member 12. To facilitate movement of the guide members relative to each other, a plurality of pairs of spaced ears 23 are fixed on the top, bottom and side walls of the guide member 12, said walls being provided with slots 24 between said ears whereby rollers 25 having trunnions 26 rotatably mounted in the ears 23 are positioned with the rollers extending through the slots 24 and engaging ways 27 on the guide member 13.

The shock cushioning structure 11 includes a cylinder 28 arranged with its axis longitudinal relative to the movement of the push plate 4. A piston 29 is slidably mounted in the cylinder 28 and has a piston rod 30 extending therefrom and slidably mounted in an opening 31 in one end 32 of the cylinder 28. In the illustrated structure, the one end 32 of the cylinder is the forward end thereof and suitable packing 33 is arranged in the opening 31 to engage the piston rod 30 to form a seal therebetween. The forward end of the piston rod is connected to the plate 4 preferably by a self-aligning mounting which, in the illustrated structure, consists of a ball-shaped end 34 on the piston rod engaged in a socket 35 in the plate 4 and retained therein by a retainer plate 36 secured to the rear face of the plate 4 by suitable fastening devices 37. The other or rear end of the cylinder 28 is closed by a head 38 secured to the cylinder by suitable fastening devices 39. The rear end of the cylinder is preferably supported and connected relative to the guide member 12 and frame member 8 by a self-aligning connection 40 which in the particular structure illustrated consists of a ball member 41 on the head 38 extending rearwardly therefrom that is engaged in a socket 42 of a plate 43 fixed to the forward face of the plate 17. The ball 41 is retained in the socket by means of a retainer plate 44 secured to the plate 43 by suitable fastening devices 45. A suitable resilient member such as a spring 46 urges the push plate 4 forwardly relative to the frame member 7. In the illustrated structure, the spring 46 is in the cylinder 28 with one end engaged with the rear cylinder head 38 and the other end engaged with the piston 29. Axial bosses 47 and 48 are arranged on the piston 29 and head 38 respectively and extend into the ends of the spring to maintain same centered relative to the cylinder.

An hydraulic fluid reservoir 49 is associated with the cylinder 28 to maintain a supply of hydraulic fluid therefor, said cylinder and reservoir having communication as later described. In the illustrated structure, the reservoir 49 surrounds the cylinder 28 and has a cylindrical outer wall 50 and end walls 51 connected to the ends of the cylinder 28 to define a fluid-retaining space or chamber 52 therebetween. Each end of the cylinder 28 has communication with the reservoir space 52 through passages 53 in valve structures 54 each having a valve 55 urged by a spring 56 into engagement with a seat 57 whereby the valve permits flow from the reservoir into the cylinder only and prevents flow from the cylinder to the reservoir through the passages 53. In order to prevent interference with the check valves 54, stop members 58 are arranged at each end of the cylinder 28 as illustrated in FIGURE 3.

A plurality of spaced orifices or ports 59 provide communication between the cylinder 28 and reservoir chamber 52. The ports 59 are longitudinally spaced along the length of the cylinder 28 between the stops 58 and each are preferably of a size to provide substantially the desired liquid flow restriction therethrough and retardation of movement of the piston 29 in the cylinder 28. In the illustrated structure, an adjustable valve screw 59' is associated with each port or orifice 59, said valve screws having end portions 60 for seating in respective orifices or ports to shut off flow therethrough and including threaded shanks that are threaded in holes 61 in the reservoir wall 50. Longitudinal slots 62 are arranged in the top walls 14 and 19 of the guide members to provide access to the heads 63 of the valve screws for adjusting same, whereby threading the valve end portions 60 away from seated position relative to the orifices or ports 59 will open same to permit increased flow therethrough. A fill pipe 64 is arranged on the reservoir for applying hydraulic liquid thereto, it being preferable that the level of the liquid be above the cylinder 28 when the piston is at the forward end of its stroke as illustrated in FIGURE 3, with an air space above the level of the liquid.

With the pusher frame member 7 supported on the tractor whereby the pusher plate 4 will align with a pusher block 5 on a scraper or load to be pushed, and with the piston 29 in forward position, as illustrated in FIGURE 3, the tractor is moved behind the scraper and then forwardly to engage the pusher plate 4 with the pusher block 5. The impact resulting from the engagement and forward movement of the tractor causes the guide members 12 and 13 to telescope, and the piston 29 to move rearwardly in the cylinder 28. In the initial portion of the rearward movement of the piston 29, the hydraulic liquid in the cylinder 28 is forced through all of the open orifices or ports 59, liquid moving from the reservoir space 52 through the check valve at the forward end of the cylinder into the cylinder to maintain the forward end thereof substantially filled with liquid. As the piston moves rearwardly, the forward ports 59 are closed thereby, resulting in fewer ports through which liquid is forced, increasing the resistance to further rearward movement of the piston. The relative movement of the piston and cylinder is thereby relatively rapid during the initial portion of such movement and is gradually slowed as the piston 29 approaches the rear end of the cylinder, and when the piston closes the last rearward port 59 there is a substantially solid material namely, the trapped liquid between the frame portion 7 and piston 29 to transmit the pushing force of the tractor through the piston rod 30 to the pusher plate 4.

When the pushing operations are completed, and the tractor and scraper moved apart, the spring 46 urges the piston 29 forwardly to return it to the position shown in FIGURE 3. During such forward movement, liquid flows from the reservoir through the check valve 54 at the rear end of the cylinder, and also through the ports 59 into said cylinder. The air space above the liquid level in the reservoir is such that the reservoir has ample capacity for receiving the additional liquid from the cylinder 28 that results in the difference in the volume in the cylinder when the piston 29 is at the rear thereof due to the piston rod 30 being in the cylinder at that time.

In some pushing operations, the shock cushion as described will be sufficient and the legs 9 and 10 of the frame portion 7 may be pivoted on the tractor frame members 2' and provided with suitable means for raising and lowering the frame to align the pusher plate 4 with the push block 5. However, in other operations, it may be desirable to have additional cushioning or to divide the cushioning members whereby two cylinders are used, one on each side of the tractor, and to further provide uniform movement of the cushioning members on both sides of the tractor. In the illustrated structure, the push frame 3 has telescoping leg portions on opposite sides of the tractor, the leg portions 9 and 10 of the frame 7 being sleeved over elongate leg members or extensions 65, the rear ends of the leg portions 65 being pivotally mounted by pins 66 on the side frame members 2'. In order to raise and lower the frame 3, a power drum 67 on the tractor is connected by a cable 68 through a multiple sheave block 69 to a multiple sheave block 69' mounted on the traverse frame member 8 whereby winding the cable on the drum 67 raises the frame 3 and unwinding of the cable from the drum 67 lowers the frame 3 to effect desired alignment of the pusher plate 4 with the push block 5.

Cushion assemblies 70 and 70' are arranged in the telescoping legs 9 and 10 respectively of the pusher frame. The cushion assemblies 70 and 70' are the same in structure and, in the illustrated structure, each of the cushion assemblies 70 and 80' include a cushion cylinder 71 and an equalizing cylinder 72 arranged in axial alignment with the cushion cylinder 71 forwardly of the cylinder 72 in the assembly 70 in the frame leg 9 and the cushion cylinder 71 rearwardly of the cylinder 72 in the assembly 70' in the frame leg 10. The adjacent ends of the cylinders 71 and 72 are secured together with heads 73 therebetween. The opposite end of the cylinder 71 has a head 74 with an extension 75 having a bore 76 therethrough to slidably mount a piston rod 77, suitable packing 78 being arranged in the bore 76 to provide a seal between the extension and the piston rod. The free ends of the piston rods 77 extending from the cylinder 71 are provided with swivel connections 79 to blocks 80 secured in the forward portions of the respective legs 9 and 10. A piston 81 is slidable in the respective cylinder 71 and fixed to the respective piston rod 77, said piston rod extending from the piston 81 through bores 82 in the headers 73 with suitable packing 83 arranged in said bores to form a seal about the piston rods 77. A piston 84 is fixed on each piston rod 77 and is slidable in the respective cylinder 72. The end 85 of the cylinder 72 remote from the cylinder 71 has a swivel connection 86 with a block 87 fixed relative to the leg member 65. In the leg member 10 the block 80 has portions 88 extending through slots 89 in the respective leg member 65. With this arrangement, the cylinders are fixed relative the leg members 65 and the pistons are connected with the leg members 9 and 10 for movement therewith. The cushion assemblies are in reversed position and the forward portion of the cylinder 72 in leg 9 of the frame 3 communicates through a duct 91 with the rear portion of the cylinder 72 in the leg 10 of the frame, and the forward portion of the cylinder 72 in the leg portion 10 communicates through a duct 92 with the rear portion of the cylinder 72 in the leg portion 9 to provide a transfer of fluid between said cylinders whereby the pistons 84 on each side of the tractor have uniform movement as force acting on one frame leg member tending to move same to the rear will be transmitted to the piston and cylinder and by the fluid through the ducts to the other piston to give a corresponding movement and resistance thereto.

The cushion cylinders 71 each have jackets 93 surrounding same to provide reservoirs 94 for hydraulic fluid. Check valves 54 are arranged in each end of the cylinders 71 and stop members 95 are also arranged in each end of said cushion cylinders to perform in the same manner as the check valves and stop members in the cylinder 28 in the cushion structure illustrated in FIGURE 3. A plurality of orifices or ports 96 are spaced longitudinally of the cylinders 71 and extend the length of said cylinders between the stop members 95, said ports 96 providing communication between the cylinders 71 and the reservoirs 94. Suitable compression springs 97 are arranged to urge the pistons 81 and 84 forwardly relative to the respective cylinders. In the structure illustrated, ears 98 and 99 are secured to the leg members 65 and 9 and 10 with a guide rod 100 fixed to the ears 98 and slidably mounted in bores 101 in the ears 99. The springs 97 are sleeved on the guide rods 100 with the ends engaging the ears 98 and 99 whereby said springs urge the frame member 7 forwardly relative to the leg members 65.

In using a structure constructed and assembled as illustrated and described, the cable drum 67 is operated to raise or lower the frame 3 to align the push plate 4 with a push block 5 of a scraper. The tractor is then moved in to engage the push plate and push block, and some of the shock will be absorbed by the shock cushion 11. Part of the shock will be transmitted to the frame member 7 tending to push same rearwardly, moving the pistons 81 in the cylinders 71, forcing liquid from the cylinders 71 at the rear of the pistons 81 through the ports 96 into the reservoir 94 and back into the cylinder at the forward ends thereof. Simultaneously, the pistons 84 are moved in the cylinders 72 to maintain the rearward movement of both sides of the frame member 7 equal, thereby preventing binding of the telescoping legs, the ports 96 communicating the rear portion of the cylinders 71 at the rear of the pistons 81 to the reservoirs being reduced in number as the piston moves rearwardly. Movement of the pistons 81 is gradually slowed until they reach the rear stops 95 at which time the solid engagement of the parts will effect a pushing movement from the tractor through the pusher frame and pusher plate to the scraper.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. A pusher attachment for a tractor having a main frame comprising, a U-shaped push frame having a transversely extending member and rearwardly extending legs at opposite end portions of said transverse member, means for pivotally mounting the rear ends of said push frame legs on said main frame for up and down swinging movement of said push frame, operative means for connecting the push frame and tractor for swinging said push frame up and down, telescoping tubular guide members movably mounted one to the other for movement longitudinally of the tractor, roller means for spacing said members from each other and for providing a substantially parallel telescopic movement therebetween, means fixing one of said telescoping guide members on said transverse frame member, a push plate fixed on the other of said telesoping guide members, a cylinder and piston assembly mounted within said telescoping guide members with a piston rod extending from one end of the cylinder thereof, means pivotally connecting the other end of said cylinder to one of said telescoping guide members, means pivotally connecting the piston rod to the other of said telescoping guide members whereby said cylinder and piston extend longitudinally within said telescoping guide members, resilient means engaging the cylinder and piston for normally urging same to extended position, a fluid reservoir having walls surrounding the cylinder, and a plurality of flow restricting orifices in the cylinder and communicating the reservoir with the cylinder at spaced points along the length of said cylinder whereby force acting on the push plate tending to retard movement of the tractor effects movement of the piston longitudinally of the cylinder in a direction toward an end thereof forcing fluid through the flow orifices between the piston and said end of the cylinder, said piston movement progressively reducing the number of flow orifices having communication with the cylinder between the piston and cylinder end toward which the piston is moving and thereby retarding discharge of fluid from said cylinder and offering increased resistance to movement of the piston in said direction.

2. A pusher attachment for a movable member comprising, a U-shaped push frame having a transversely extending member and rearwardly extending legs, leg extensions having guiding engagement with said rearwardly extending legs for relative movement longitudinally of the movable member, means for mounting the rear end portions of said leg extensions on said movable member, a cylinder and piston assembly with a piston rod extending from one end of the cylinder thereof in each of said legs and leg extensions, means connecting the other end of said cylinders to one of the respective legs and leg extensions, means pivotally connecting the piston rods to the other of said respective legs and leg extensions, a fluid reservoir surrounding each of said cylinders, a plurality of flow restricting orifices communicating the reservoirs with the respective cylinders at spaced points along the length of said cylinders whereby force acting on the transverse member of the push frame tending to retard movement of the movable member effects movement of the respective pistons longitudinally of the respective cylinders toward said one end thereof forcing fluid through the flow orifices between the pistons and said one end of the cylinders, the movement of said pistons progressively reducing the number of flow orifices having communication with the respective cylinders between the respective pistons and said one end of the cylinders toward which the pistons are moving and thereby retarding discharge of fluid from said cylinder and offering increased resistance to movement of the pistons in said direction, resilient means engaging the frame legs and leg extensions to urge same apart for producing extension of the cylinders and pistons, and means associated with said cylinders for maintaining substantially uniform movement of the pistons with respect to the cylinders.

3. A pusher attachment for a movable member comprising, a U-shaped push frame having a transversely extending member and rearwardy extending legs at opposite end portions of said transverse member, leg extensions having guiding engagement with said rearwardly extending legs for relative movement longitudinally of the movable member, means for mounting the rear end portions of said leg extensions on said movable member, a cylinder and piston assembly with a piston rod extending from one end of the cylinder thereof in each of said legs and leg extensions, means connecting the other end of said cylinders to one of the respective legs and leg extensions, means connecting the piston rods to the other of said respective legs and leg extensions, a fluid reservoir surrounding each of said cylinders, a plurality of flow restricting orifices communicating the reservoirs with the respective cylinders at spaced points along the length of said cylinders whereby force acting on the transverse member of the push frame tending to retard movement of the tractor effects movement of the pistons longitudinally of the respective cylinders in a direction toward said one end thereof forcing fluid through the flow orifices between the piston and said one end of the respective cylinders, said piston movement progressively reducing the number of flow orifices having communication with the cylinder between the piston and said one end of the cylinders toward which the pistons are moving and thereby retarding discharge of fluid from said cylinders and offering increased resistance to movement of the pistons in said direction, resilient means engaging the frame legs and leg extensions to urge same apart for producing extension of the cylinder and pistons, second cylinders in axial alignment with the first-named cylinders, pistons in said second cylinders, piston rods connecting the pistons in the second cylinders with the pistons in the first-named cylinders for cooperative movement therewith, and flow passages connecting the ends of one of said second cylinders to the opposite ends of the other of said second cylinders for maintaining substantially uniform movement of the second cylinder pistons with respect to the second cylinders.

4. A pusher attachment for a movable member comprising, a push frame, a push member forwardly disposed on said frame, a pair of leg members extending rearwardly from said frame, leg extensions having guiding engagement with said rearwardly extending leg members for relative movement therewith, biasing means for maintaining said legs and said extensions in a predetermined normal relation, means for mounting the rear end portions of said leg extensions on said movable member, a pair of shock absorbing means each secured to one of said legs and to its respective extension whereby said relative movement of said legs and extensions from said predetermined relation is resisted, and means connecting said shock absorbing means and adapting the latter to maintain equal movement of each of said extension with respect to said legs.

5. A push attachment for a tractor comprising,
(a) a push frame having rearwardly extending leg portions adapted to be secured to said tractor, and a forwardly disposed transverse member interconnecting said leg portions,
(b) a push member located forwardly of said push frame,
(c) cooperating guide mounting means comprising a first tubular member mounted on said transverse member and a second tubular member having one end mounted on said push member and the other end disposed within said first tubular member for telescopic movement therein, a series of rollers mounted through the surface of said first tubular member and abutting said second tubular member for providing substantially parallel rearward movement of said second member relative to said first member when a pushing force is applied to said push member,
(d) a cylinder mounted between said push and transverse members and having a plurality of flow ports spaced longitudinally along the wall thereof and a piston therein connected to said push frame and located between said push frame and push member,
(e) a piston in said cylinder having a piston rod extending from one end end of said cylinder and said push member,
(f) a fluid reservoir in fluid communication through said ports with said cylinder whereby force acting on the push member toward the push frame effects movement of the piston longitudinally of the cylinder in a direction toward said frame thereby forcing fluid through said flow ports in said cylinder into said fluid reservoir, said piston movement progressively reducing the number of flow ports having communication with the fluid reservoir to offer progressively increasing resistance to further continued movement of the piston.

6. Apparatus as defined in claim 5, wherein said cylinder is mounted within said cooperating guide mounting means.

7. Apparatus as defined in claim 6, wherein the cylinder and piston are universally secured to said transverse and push members respectively.

8. For a tractor or the like, a pusher attachment comprising:
(a) a push member,
(b) means for mounting said push member on said tractor for parallel movement toward and away from said tractor comprising a pair of guide members arranged one within the other for susbtantially parallel telescopic movement,
(c) hydraulic shock absorbing means pivotally connected within said telescopic guide members between said mounting means and said push member and adapted to progressively resist movement of the push member toward the tractor,
(d) a fluid reservoir and means providing fluid communication between said shock absorber and said reservoir including means for regulating the resistance offered by said shock absorber.

9. A pusher attachment for a movable member comprising:
(a) a push frame
(b) a push member forwardly disposed on said frame
(c) a pair of leg members extending rearwardly from said frame, leg extensions having guiding engagement with said rearwardly extending leg members for relative movement therewith
(d) biasing means for maintaining said legs and said extensions in a predetermined normal relation (e) means for mounting the rear end portions of said leg extensions on said movable member (f) a pair of shock absorbing means each secured to one of said legs and to its respective extension whereby said relative movement of said legs and extensions from said predetermined relation is resisted (g) a closed fluid equalizing system comprising a pair of cylinders each fixed to one of said shock absorbing means, means interconnecting the opposite ends of said cylinders for fluid communication, and a piston in each of said cylinders connected with said shock absorber means for transmitting fluid from one of said cylinders to the other whereby relative displacement of one of said leg members to its respective extension causes a corresponding relative motion of said other leg member and its respective extension.

References Cited by the Examiner

UNITED STATES PATENTS

| | | | |
|---|---|---|---|
| 1,570,479 | 1/26 | Goldensky et al. | 188—88.53 |
| 1,658,962 | 2/28 | Aikens | 293—50 |
| 1,821,787 | 9/31 | Black | 188—88.53 |
| 1,977,817 | 10/34 | Bird | 280—481 X |
| 2,404,931 | 7/46 | Somervell | 293—86 |
| 2,919,142 | 12/59 | Winget | 280—481 |
| 2,999,697 | 9/61 | Winget. | |

A. HARRY LEVY, *Primary Examiner.*

PHILIP ARNOLD, LEO FRIAGLIA, *Examiners.*

UNITED STATES PATENT OFFICE
CERTIFICATE OF CORRECTION

Patent No. 3,214,192            October 26, 1965

Norman R. Hamm

It is hereby certified that error appears in the above numbered patent requiring correction and that the said Letters Patent should read as corrected below.

Column 1, line 27, for "hereof" read -- thereof --; column 4, line 74, for "traverse" read -- transverse --; column 8, lines 1 and 2, after "maintain" insert -- substantially --.

Signed and sealed this 31st day of May 1966.

(SEAL)
Attest:

ERNEST W. SWIDER            EDWARD J. BRENNER
Attesting Officer            Commissioner of Patents